(12) United States Patent
Guglielmo

(10) Patent No.: US 9,568,939 B2
(45) Date of Patent: *Feb. 14, 2017

(54) TACTILE FEEDBACK FOR JOYSTICK POSITION/SPEED CONTROLS

(71) Applicant: Enovation Controls, LLC, Tulsa, OK (US)

(72) Inventor: Kennon Guglielmo, San Antonio, TX (US)

(73) Assignee: Enovation Controls, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,493

(22) Filed: Feb. 29, 2016

(65) Prior Publication Data

US 2016/0179128 A1 Jun. 23, 2016

Related U.S. Application Data

(63) Continuation-in-part of application No. 14/275,088, filed on May 12, 2014, now Pat. No. 9,272,889, which
(Continued)

(51) Int. Cl.
*G05G 9/047* (2006.01)
*G05G 9/06* (2006.01)
*B62D 1/12* (2006.01)
*G05G 1/04* (2006.01)
*B66F 11/04* (2006.01)
(Continued)

(52) U.S. Cl.
CPC *G05G 9/06* (2013.01); *B62D 1/12* (2013.01);

*B66F 11/04* (2013.01); *B66F 11/046* (2013.01); *B66F 17/006* (2013.01); *G05G 1/04* (2013.01); *G05G 9/047* (2013.01); *G06F 3/016* (2013.01); *G06F 3/0338* (2013.01); *G05G 2009/0477* (2013.01); *G05G 2009/04766* (2013.01); *G05G 2009/04777* (2013.01); *G06F 2203/015* (2013.01); *H01H 2003/008* (2013.01); *Y10T 74/20201* (2015.01)

(58) Field of Classification Search
CPC .............. G05G 9/047; G05G 2009/047; G05G 2009/04766; G05G 2009/0477; G05G 2009/04777; G06F 2203/015; H01H 2003/008

See application file for complete search history.

(56) References Cited

U.S. PATENT DOCUMENTS 5,019,761 A 5/1991 Kraft
5,513,100 A 4/1996 Parker et al.
(Continued)

*Primary Examiner* — Andrew Bee
(74) *Attorney, Agent, or Firm* — William H. Quirk; Jesse L. Frizzell; Rosenthal Pauerstein Sandoloski Agather LLP

(57) ABSTRACT

A joystick controller is disclosed for controlling movement of a boom lift platform, the controller having actuators or the like that provide one or more forms of tactile feedback that are intuitively interpreted and adjusted by the user of the joystick motion control, the joystick being neutrally-biased to effect a null movement when the joystick is positioned in a neutral position, but also being adapted with at least one form of tactile feedback by which the joystick controller conveys information about the boom lift's operation to the joystick operator, such as through resistive force or through vibrations or the like.

17 Claims, 8 Drawing Sheets

Related U.S. Application Data is a continuation of application No. 13/846,177, filed on Mar. 18, 2013, now Pat. No. 8,723,638, which is a continuation of application No. 12/773,170, filed on May 4, 2010, now abandoned.

(60) Provisional application No. 61/217,552, filed on Jun. 1, 2009.

(51) Int. Cl.
*B66F 17/00* (2006.01)
*G06F 3/01* (2006.01)
*G06F 3/0338* (2013.01)
*H01H 3/00* (2006.01)

(56) References Cited

U.S. PATENT DOCUMENTS

| | | |
|---|---|---|
| 5,721,566 A | 2/1998 | Rosenberg et al. |
| 5,727,387 A | 3/1998 | Hosseini et al. |
| 5,899,008 A | 5/1999 | Cobo et al. |
| 6,140,787 A | 10/2000 | Lokhorst et al. |
| 6,405,114 B1 * | 6/2002 | Priestley ............... B66F 11/046 182/18 |
| 6,580,417 B2 | 6/2003 | Rosenberg et al. |
| 6,859,198 B2 | 2/2005 | Onodera et al. |
| 7,019,238 B2 | 3/2006 | Kobayashi |
| 7,041,029 B2 | 5/2006 | Fulghum et al. |
| 2004/0221674 A1 * | 11/2004 | Kornelson ............. G05G 9/047 74/471 XY |
| 2006/0007184 A1 | 1/2006 | Rosenberg et al. |
| 2007/0268251 A1 | 11/2007 | Edmunds |
| 2009/0244106 A1 * | 10/2009 | Kuwae .................. B60K 35/00 345/690 |

* cited by examiner

TACTILE FEEDBACK FOR JOYSTICK POSITION/SPEED CONTROLS

CLAIM OF PRIORITY TO PRIOR APPLICATION

This application claims the benefit of the filing date and is a continuation-in-part of U.S. Non-Provisional application Ser. No. 14/275,088, filed on May 12, 2014, which is a continuation of U.S. Non-Provisional application Ser. No. 13/846,177, filed on Mar. 18, 2013, which is a continuation of U.S. Non-Provisional application Ser. No. 12/773,170, filed on May 4, 2010, which claims the benefit of the filing date of U.S. Provisional Application, Ser. No. 61/217,552, filed on Jun. 1, 2009, entitled "Tactile Feedback for Joystick Position/Speed Controls," the entire disclosures of which are hereby incorporated by reference into the present disclosure.

BACKGROUND OF THE INVENTION

Technical Field

Many aspects of this invention relate in general to proportional joystick speed controls for powered implements and, more particularly, to comprehensive systems and methods for providing an operator with feedback related to the actual speed of the object(s) being moved or the platform, bucket or the like that supports it. Some aspects of the invention also relate to the machines, systems, applications, components, and methods associated with such proportional speed controls.

Background Art

Powered implements can be found in a huge variety of applications, from forklifts, backhoes, excavators and off-highway construction equipment and the like to cherry-pickers and other boom lift movers, carriers or platforms. Many powered implements use proportional speed controls in the form of a joystick or an equivalent type of lever or knob that controls the actuators to do the powered moving. Actuators are often hydraulic but may also come in other forms such as electric, pneumatic, electro-magnetic, or some combination thereof. Even though the present invention is beneficial for many lever-based or knob-based variable speed controllers for virtually any powered lifters, boom lift platforms provide a representative context that will be referenced for the bulk of the descriptions in this application. Those of skill in the art will understand how the advantages and features in the boom lift platform context can be translated to other contexts within the scope of the inventions.

It takes an incredibly experienced boom lift operator to quickly yet precisely control the movement of an elevated platform to within an inch or so of the desired position without overshooting and correcting. Overshooting the intended position can be hazardous, particularly when that position is close to a structure that can be damaged if impacted by the boom-lift platform. Due in part to the nature of hydraulic actuators that are typically used for boom-lift platforms, there is a constant tension between responsive controls and smooth operation. Without sophisticated controls that are common today, platform movements can be very jerky.

On the other hand, because of the great effort to smooth out the movements of aerial platforms, it is very difficult to predict how much further a platform will travel before stopping once the joystick controller is released to the neutral position. The slow, gradual approach with fine movement control can be extremely time-consuming. In the interest of time, skilled operators therefore try to speed the platform toward the desired position and let go of the joystick a foot or two before the platform reaches the desired location, hoping they have predicted well enough to avoid a collision.

Joystick speed controls have long been one of the most popular types of manual devices for controlling speed. Numerous techniques are known for enhancing the basic joystick controller, as are evidenced by the following patents within the background art: U.S. Pat. Nos. 5,019,761; 5,513,100; 5,721,566; 5,727,387; 5,899,008; 6,859,198; and 7,019,238. Boom lift platforms and comparable position and/or speed controls are commercialized by JLG, Genie, Caterpillar, Case Corporation, John Deere, Bobcat, and Hitachi.

A sizable, unmet need has been revealed in relation to optimizing such movements, particularly in the interest of getting a boom lift platform to a desired position quickly yet safely. Related needs include the goal to minimize unnecessary cost and complexity, to enhance ease of use, and to shorten the training curve for safe boom lift operators. It is an object of the present invention to address these and other needs presented by the prior art. Other objects include enabling such primary objects while also allowing a highly skilled operator to override selectable features of preferred embodiments.

Known feedback technology helps, but more has long been needed. Overriding objects of the present inventions also include providing speed control systems, components and methods that facilitate and adjust, based on an accurate yet responsive position control system.

SUMMARY OF THE INVENTION

The present invention is just the answer for many of the unmet needs that have plagued the prior art—aspects of the invention allowing precise yet smooth speed control with tactile feedback that is intuitively interpreted and adjusted by the user of the joystick speed control. Applicant is thought to have developed a more reliable way to control the operation of neutrally-biased joystick controllers of the type that effect a null velocity when the joystick is positioned in a neutral position, a first velocity when the joystick is moved to a first extent from said neutral position, and a greater velocity when the joystick is moved to a greater extent in the same direction, often proportionally or quasi-proportionally. The invention can be embodied in control methods as well as joysticks and joystick controllers, or more complex systems that use such joysticks or controllers, such as for controlling movement of a powered implement.

Basic aspects of the invention adapt such joysticks, controllers, implements or systems to enable or provide tactile feedback to the joystick operator. Within the context of the present disclosure, the term "tactile feedback" refers to feedback that the operator of a joystick, communicated in forms that can be felt through the joystick by the operator's hand touching the joystick.

Such tactile feedback can be in the form of a feedback system that temporarily overrides the neutral bias of the joystick and instead biases the joystick to a position(s) that corresponds to the actual speed of the subject whose speed is being controlled by the joystick—the "actual-speed-biased position." In these and other respects, tactile feedback may also refer to tactile indications of a particular condition(s) that is related to the current position or current operating parameters of a powered implement whose movement is controlled by the joystick. In some embodiments, such tactile indications are provided to a user as vibrations or other haptic forms, wherein these tactile indications can be appropriately designated "haptic feedback." Such haptic feedback may include, but not be limited to, a vibration or series of vibrations of the joystick handle which alerts a user to various types of operational conditions of which the user should be aware with respect to the present operation of a hydraulically powered implement. Some operational conditions which might trigger this type of haptic feedback may include, but not be limited to, the user commanding movement of the powered implement which is beyond the mechanical capabilities of the powered implement and/or an indication that the powered implement is or could be placed in a dangerous condition based on inputted commands, both of which are described in more detail further herein.

Other aspects of the invention combine such tactile feedback with active influence on the speed of the subject whenever the joystick is forced to a position outside of its actual-speed-biased position. While there are many alternative variations, modifications and substitutions within the scope of the invention, one of ordinary skill in the art should consider the scope of the invention from a review of the claims appended hereto (including any amendments made to those claims in the course of prosecuting this and related applications) as considered in the context of the prior art and the various descriptions of this application.

Many other objects, features and advantages of the present invention will be evident from the remainder of this application in light of a more exhaustive understanding of the numerous difficulties and challenges faced by the prior art, which in turn will be evident to those skilled in the art.

BRIEF DESCRIPTION OF THE SEVERAL VIEWS OF THE DRAWINGS

For a more complete understanding of the present invention and its preferred embodiments, and the advantages thereof, reference is now made to the following descriptions taken in conjunction with the accompanying drawings, in which:

FIG. 3 represents the basic functionality associated with a joystick controller in the prior art.

FIG. 4 represents the functionality of a joystick controller 10 of the present invention implementing a first aspect of tactile feedback of the joystick system and method of the present invention.

FIG. 5 illustrates a manner in which joystick position is manipulated by hand from a full forward, to a hold forward position, and finally to a forced neutral position characteristic of certain aspects of the present invention.

FIG. 6 illustrates utilization of a user-controlled switch that allows for an instantaneous change from the first functionality described above with FIG. 4 to the second functionality described with FIG. 5.

DETAILED DESCRIPTION OF ILLUSTRATIVE EMBODIMENTS

The Larger Contexts

Figure 1:
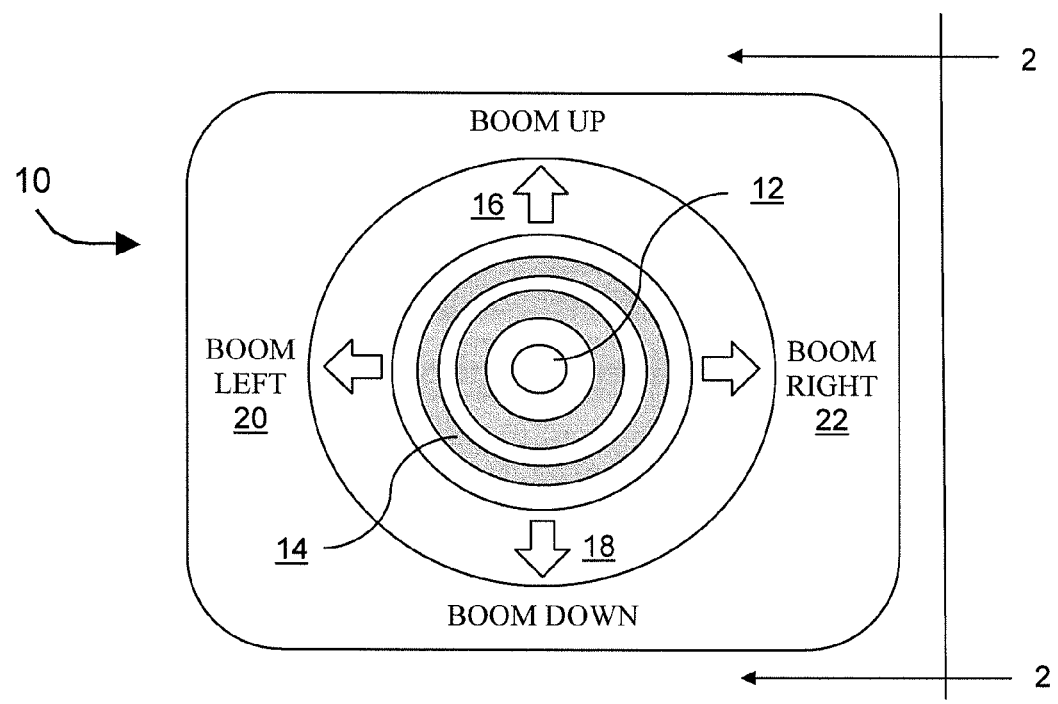
FIG. 1 is top-down view of a joystick control 10 that is illustrative of a joystick that can be used to achieve the present invention, viewed at an angle perpendicular to the plane of the associated control panel.

While the inventions that are the subject of this application are much more basic than any particular embodiment, one can gather a partial appreciation for some of the possible benefits of the broader inventions and possible interplay between various elements of the inventions in the course of considering presently preferred embodiments. A few embodiments that are presently thought to include the most preferred are depicted in relation to FIGS. 1-11 of the drawings, where similar reference numerals are used for similar elements of various embodiments. The systems and methods depicted therein allow for efficient and effective speed control that provides intuitive tactile feedback to the operator, together with related measures for controlling the motion of an intended subject.

The present invention finds application in any of a number of control system environments where a level of responsive feedback is desired with the user manipulation of joystick-type controls. For purposes of this description and the accompanying claims, the term "implement" will be a generic reference to whatever is being moved by the embodiment of the present invention herein described which includes, but is not limited to, forklifts, backhoes, excavators, skid-steer loaders, other off-highway construction equipment, cherry-pickers and other boom lift movers, carriers or platforms.

Basic Aspects of the Invention

The following example of an application of the present invention to a telescoping boom lift vehicle is simply one of a number of different application environments within which the invention finds utility. Utility can be found according to broad aspects of the present invention in virtually any system where the movement of a stick, lever or knob control mimics the direction and speed motion of a remotely operated subject.

A basic aspect of the present invention is to adapt joystick controller systems and methods to provide the user with tactile feedback on the direction and speed of motion of a joystick-controlled subject, particularly in relation to decreases in the speed of such motion. Variations on such basic aspects are described in the following detailed description and are intended to be viewed in conjunction with the appended drawing figures.

Standard Joystick Controllers.

Reference is made first to FIG. 1 for a brief description of the nomenclature typically associated with the structure and function of a standard joystick-based hydraulic motion control system. FIG. 1 is a partially schematic diagram showing the basic orientation of a joystick controller device 10 with the joystick handle 12 centrally positioned on the joystick controller area of an instrument control panel. (See FIG. 11 and the description thereof as an example of a more complete instrument control panel.) Joystick boot or dust cover 14 surrounds joystick handle 12 and allows linkage to and protection for the functional components of the joystick controller. A typical joystick of the type that might be used in conjunction with a dual motion system (such as the telescoping boom lift vehicle that is provided as an example in the present application) involves the multi-directional movement for the joystick handle 12 shown in FIG. 1. The multiple directions (essentially movable in any radial direction 360° about the center point of the joystick handle 12) may be isolated and divided into four orthogonal directions carrying out four basic motions for the hydraulically driven subject.

In FIG. 1, and in the example utilized generally in the present application, movement of the joystick handle 12 upward may carry out a "boom up" actuator motion 16 as shown, or alternately, a "drive forward" motion. Movement of the joystick in the opposite direction carries out a "boom down" actuator motion 18 as shown, or alternately, a "drive in reverse" motion. Left and right motions of the joystick handle 12 carry out a boom left actuator motion 20 or a boom right actuator motion 22, or alternately a left and right steering motion. As described in more detail below, the boom up motion 16 and boom down motion 18 in the present example essentially operate to extend or retract the length of the boom on which the elevated platform is positioned. The boom left motion 20 and the boom right motion 22 on the other hand, carry out a sideways motion that swings the boom (and the elevated platform) to the left or right as directed. It is this combination of motions that is most useful to an operator, either positioned on the ground operating the telescoping boom lift or on the platform itself moving the platform to a position appropriate for work to be carried out.

Figure 2:
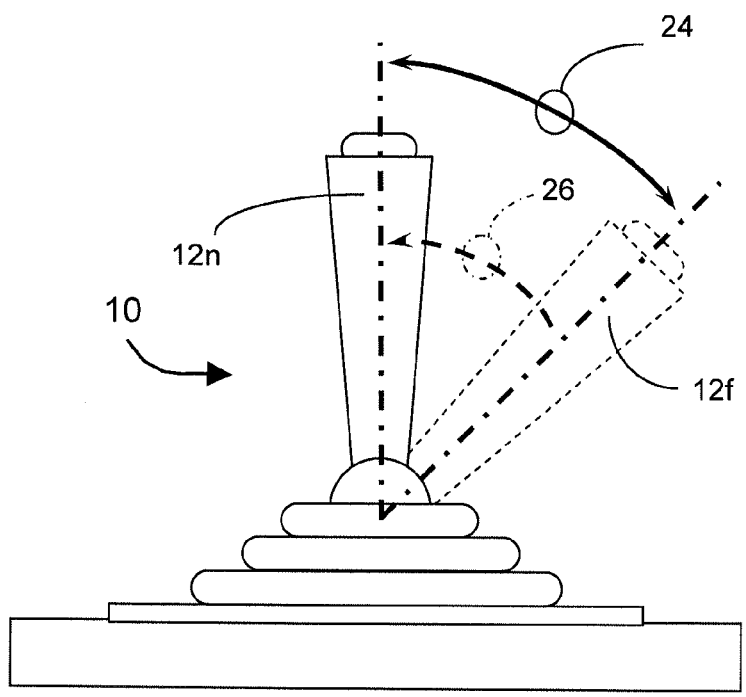
FIG. 2 is an elevation view of the joystick control 10 of FIG. 1, viewed on plane 2-2 indicated in FIG. 1.

FIG. 2 is a side elevation view of the basic joystick controller device 10, in this case showing the various positions and motions associated with joystick handle 12. A first position for joystick handle (neutral position) 12n may be characterized as the resting, non-active position of the basic joystick controller. A second position for joystick handle (fully activated position) 12f is shown whereby the joystick handle is moved (by hand) to a full rotated or maximum tilted position in one specific direction from its neutral position. Motion arrow 24 in FIG. 2 represents the joystick motion as may be directed by hand, i.e., towards a fully activated position 12f or back to a neutral position 12n. Motion arrow 26 represents a biased motion typically associated with such joystick controllers whereby the joystick is biased to return to the neutral position 12n when the force of the hand manipulation is released or relaxed. Further details on these alternate manners of returning the joystick to a neutral position are provided below.

Figure 3:
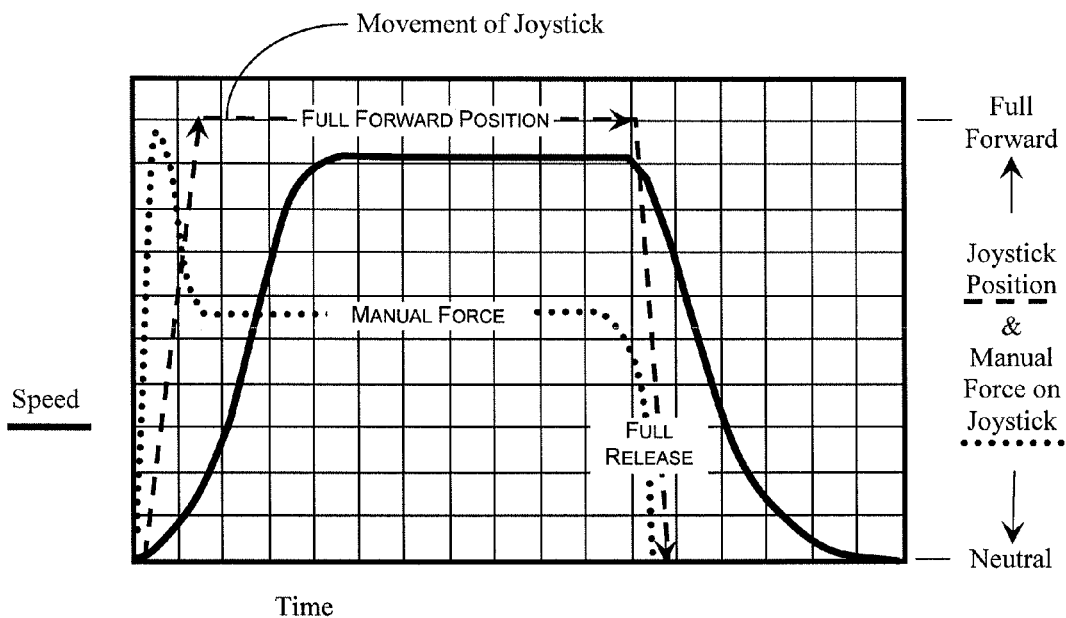
FIGS. 3-6 are graphic illustrations of the manner in which the prior art joystick controllers and the joystick controller of the present invention operate during use.

FIGS. 3-6 provide a graphic description of the manner in which the prior art joystick controllers and the joystick controller of the present invention operate during use. FIG. 3 represents the basic functionality associated with a joystick controller in the prior art. As time progresses (on the horizontal axis) through an action movement of the joystick, both the motion speed of the hydraulic system under control is shown (solid line) and the joystick position itself is shown (dashed line). Starting from a neutral position, the joystick is moved to a full forward position at which point it is held for a period of time before it is fully released. The responsive action of the hydraulic system is shown in FIG. 3 by a solid line. Once the joystick is manipulated to a forward full position, the action of the hydraulic system increases in speed rapidly to a maximum speed that is held for the duration of the joystick being held in a full forward position. Once the full forward position is released and the joystick position returns to neutral (generally in an abrupt manner as the joystick is neutral-biased with a spring or other mechanism to immediately return to the neutral position), the motion speed of the hydraulic system, rather than being abruptly dropped to zero, gradually decreases on a sustained slope back to zero so as to prevent the abrupt motion of the subject being moved.

Figure 4:
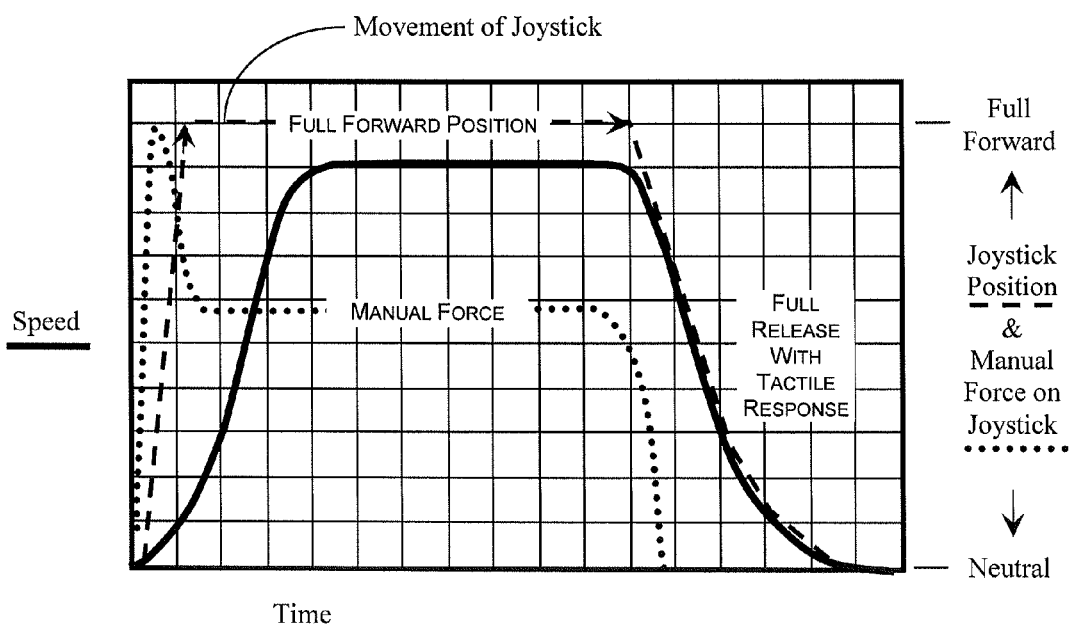

FIG. 4 represents the functionality of a joystick controller of the present invention implementing a first functional feature of the system and method of the present invention and is shown to distinguish the system of the present invention from the prior art. In FIG. 4 the same forward full motion of the joystick initiates a rapid increase in motion speed (solid line) of the controlled hydraulic system. As the joystick position is held in the full forward position, the motion speed reaches a maximum and is maintained for the duration of the joystick being held in the full forward position. Once the joystick is released from the full forward position, however, rather than a sudden drop back to a neutral position, the joystick is gradually brought back to its neutral position at a rate commensurate with the rate at which the hydraulic system itself is reduced in speed back to zero. In other words, rather than the joystick providing no indication and no feedback as to the operational functionality of the hydraulic system (as in the prior art), the joystick now provides some indication and some tactile response to the operator, as to the manner in which the release of the joystick gradually reduces the operational motion speed of the hydraulic system. This operational methodology provides a number of advantages over the prior art that are described in more detail below.

The first functionality of the system of the present invention shown in FIG. 4 is operable whether the user simply releases the joystick from a full forward position or attempts to direct the joystick back to the neutral position. The mechanism associated with the joystick (as described in detail below) provides a resistance to the return to neutral motion to a degree that mimics the rate at which the hydraulic system itself reduces and terminates the motion of the vehicle component. This tactile feedback gives the user a more accurate sense of not only the direction of motion but also the rate at which that motion is increasing or decreasing.

Figure 5:
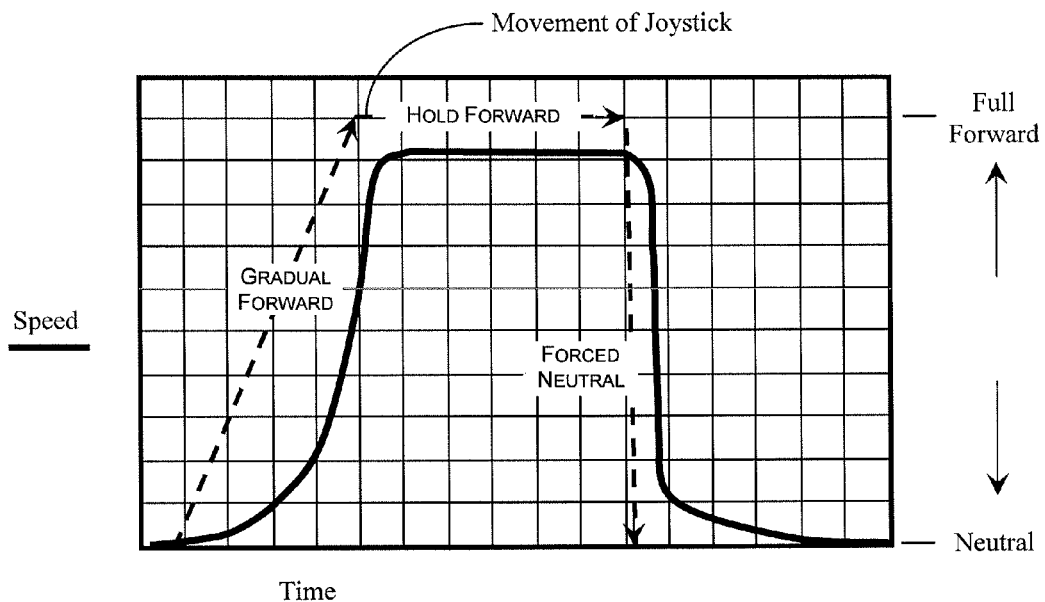

Reference is now made to FIG. 5 for a detailed description of a second functionality associated with the systems and methods of the present invention. FIG. 5 discloses a manner in which the joystick position is manipulated by hand from a full forward, to a hold forward position, and finally to a forced neutral position. Whereas FIG. 4 showed a release or a directed motion of the joystick by the operator in a manner that allows or directs the joystick (and the hydraulic system) to return to its neutral or no motion position over a controlled period of time. In some instances it may be desirable to provide a more rapid response by allowing the joystick to be immediately directed to the neutral position and to thereby terminate the motion of the vehicle component as quickly as the hydraulic system will allow. FIG. 5 represents an action method whereby the operator may force the joystick back to a neutral position (without simply releasing it) and not be met with the resistive force of the first functionality of the system described above. In this instance, rather than allowing the hydraulic system to gradually decrease its motion speed down to the point of zero motion or a stop condition, the forced neutral action on the joystick position creates an abrupt, or nearly abrupt, decline in the motion speed of the hydraulic system such that the previously moving component of the system arrives at a very abrupt, or nearly abrupt, stopped condition under the control of the operator handling the joystick. Any number of environments and operational vehicles might require such an action from the joystick controller. The present invention anticipates this second functionality to be an optional addition to the first functionality associated with the actions described above with FIG. 4. In other words, the system may, as described in more detail below, provide the option of allowing a forced neutral joystick position to direct the abrupt stoppage of the hydraulic system, or to carry out the gradual decline in the motion speed of the hydraulic system as described in FIGS. 3 & 4.

Forms of tactile feedback which may be implemented with joystick handle 12 may particularly incorporate haptic feedback for an operator of a boom lift vehicle, either together with or as an alternative to other particular forms of tactile feedback as described herein. Preferred haptic embodiments utilize one or both of two modes of haptic feedback. The first mode of haptic tactile feedback is employed by joystick handle 12 when an operator inputs a command to the boom lift wherein such command is beyond the mechanical capabilities of the boom lift such that the boom lift is unable to complete the inputted command. As one example, if the operator inputs a speed command, through manipulation of joystick handle 12, which the hydraulic system is not capable of performing as requested, the joystick handle 12 will vibrate. Preferably, such vibration is provided in addition to any resistive force feedback which might occur under the circumstances due to actual-speed-biased tactile feedback. The vibration of joystick handle 12 is preferably in proportion to the discrepancy between the inputted command and the capabilities of the boom lift, so that the larger the discrepancy between the command and the boom lift's capability, the stronger the vibration. Employment of haptic tactile feedback in this type of scenario is intended to alert the operator that the command input is not presently achievable in accordance with the boom lift's mechanical capabilities, although the system can be adapted to communicate other information also or as an alternative.

A second mode of haptic tactile feedback is preferably employed when the powered implement encounters or is placed in a position which is generally considered a dangerous operating condition. For instance, a boom lift vehicle may be equipped with a counterbalancing weight which prevents the boom lift from tipping during operation. As will be understood by those of ordinary skill in the art, the implement on the distal end of a boom may only be extended to particular distances in relation to the boom lift's then-current configuration in order to keep the boom lift vehicle in safe balance with the aid of counterweights and braces. For any particular weight load being borne by the implements, once the boom lift platform has reached its limits with respect to the extension and angular configurations of the boom lift which can be counterbalanced by the counterweight on the opposite side of the boom lift vehicle's fulcrum, any command input which would exceed the balancing capability provided by the counterweight would put the boom lift in danger of tipping over which, in turn, would put the operator at risk of injury or worse.

It is in such a scenario in which the second mode of haptic feedback would be ideally implemented by the joystick controller. If the operator of the boom lift attempted to input a command which would result in a dangerous situation, the controller causes joystick handle 12 to vibrate as a warning that danger may be imminent. Preferably, such vibration would be distinguishable from the first mode of haptic tactile feedback described previously—distinguishable based on the degree and/or pattern of vibration. Furthermore, the vibration as a warning of a potentially dangerous situation would be unmistakable as a signal of such potentially dangerous situation, based on employment of a heavy or maximum vibration of joystick handle 12. Thus, it is contemplated that an operator would be able to distinguish between the two modes of haptic tactile feedback based on either or both the degree of vibration and the pattern of vibration.

Other variations of haptic tactile feedback will also be evident to those of ordinary skill in the art, such as through implementation of infinitely variable vibration intensities to convey degrees of variation from ideal situations. For instance, to use haptic feedback as an alternative to the actual-speed-biased form of tactile feedback described elsewhere, vibration intensity can be used to indicate the magnitude of difference between joystick position and actual conditions. To do so, a joystick handle can be caused to vibrate with an intensity that is proportional or quasi-proportional to that difference. Many other alternatives will also be understood from a thoughtful review of these descriptions in light of the prior art.

Override.

Figure 6:
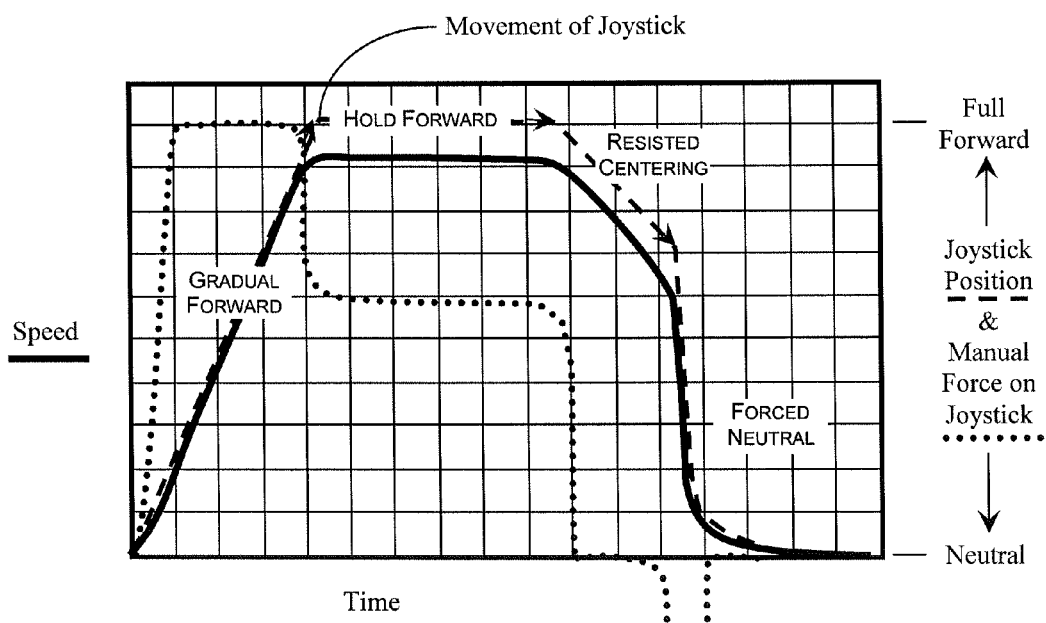

Reference is now made to FIG. 6 which describes the utilization of a user-controlled switch that allows for an instantaneous change from the first functionality described above with FIG. 4 to the second functionality described with FIG. 5. With the system defaulting to the first functionality (resistance to a return to neutral), the operator may initially draw the joystick back to neutral and receive the tactile feedback that indicates the gradual reduction in the previously directed motion. If such a reduction in motion is sufficient and safe, the user may choose to continue with this functionality through to the neutral position. If, however, the user determines that such a gradual reduction in the motion of the vehicle component is not sufficient or is not safe, then either (a) an override switch may be activated to override the first functionality and abruptly stop the movement, or (b) the joystick can be forced to its neutral position to achieve a second functionality (that of FIG. 5) so as to allow a more immediate return to neutral and thereby, a more immediate reduction or stoppage of the motion directed by the hydraulic system. The user-activated switch may preferably be positioned on the end of the joystick where the user may quickly activate it without removing his/her hand from the control.

Figure 7:
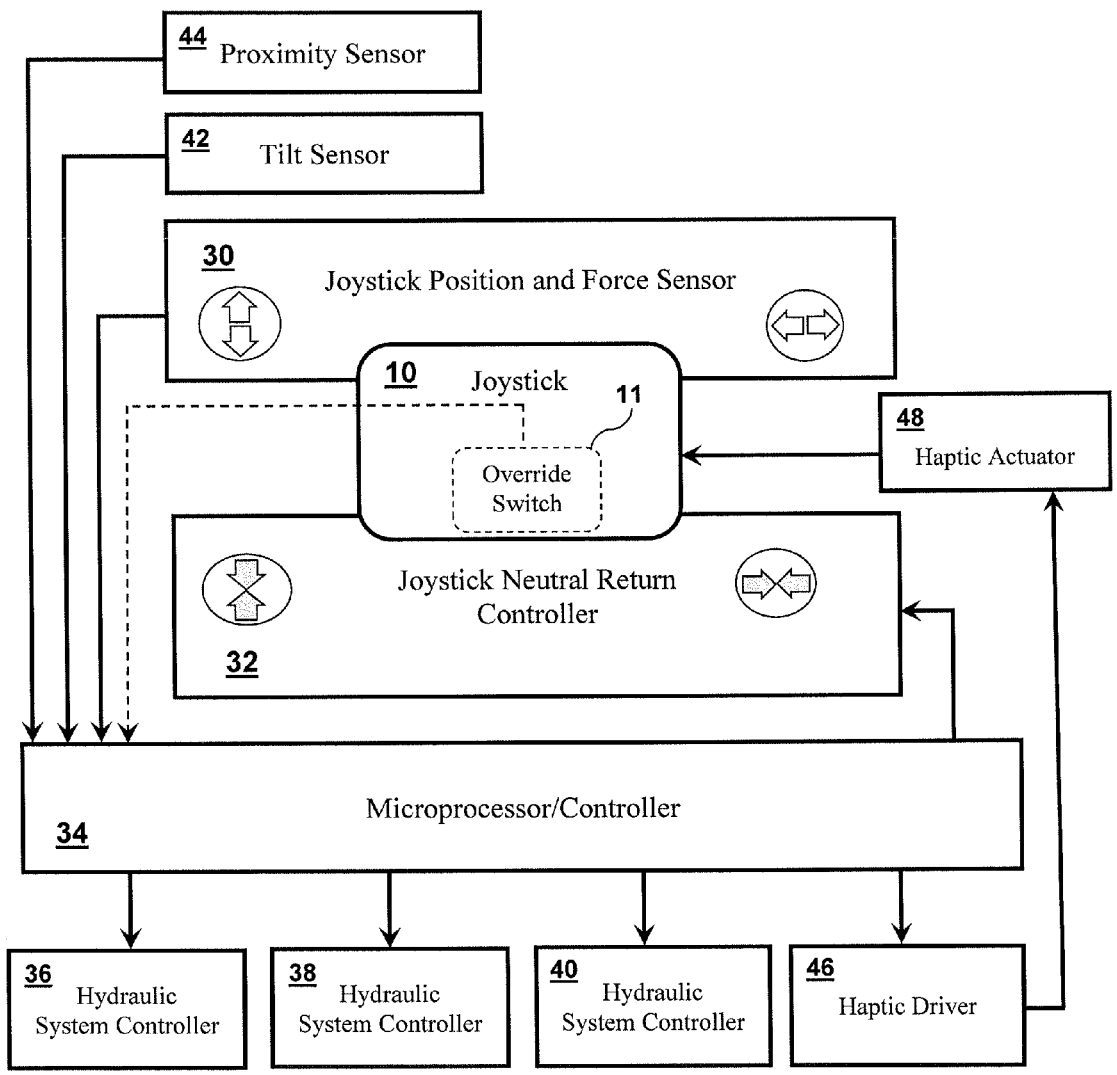
FIG. 7 illustrates basic components of a control system of the present invention for carrying out the methodology described with reference to FIGS. 4-6.

Reference is now made to FIG. 7 for a detailed but generic description of the basic components of the system of the present invention required for carrying out the inventive methodology. Joystick 10 in the present invention is generally associated with a joystick position sensor 30 and a joystick neutral return controller 32. Joystick position sensor 30 essentially identifies the manipulated positioning of joystick 10 through the various two-axis coordinates mentioned above. In a similar manner, joystick neutral return controller 32 operates to direct the position of joystick 10 through the same two-axis motions. Optional override switch 11 is shown as it would be positioned in association with joystick 10, although equivalent functionality is achievable when the operator releases the powered implement's safety switch (typically in the form of a foot pedal or grip button that has to be pressed in order for any of the actuators to be engaged).

Both joystick position sensor 30 and joystick neutral return controller 32 are associated with microprocessor/controller 34. Joystick position information is provided to microprocessor/controller 34 and serves as the basis for directing the motion of the various hydraulic system controllers associated with the subject under control. Joystick neutral return controller 32 receives control signals from microprocessor/controller 34 and directs the actual automated positioning of joystick 10 as a result. Optional override switch 11 is likewise electrically connected to microprocessor/controller 34 such that activation of the switch will terminate the resistive feedback force that joystick neutral return controller 32 would normally provide.

In this component arrangement to the joystick controller, each of the motions and control actions described above with FIGS. 4, 5 & 6 can be implemented. Microprocessor/controller 34 directs the control of multiple hydraulic system controllers (36, 38, and 40), each of which is associated with one or more hydraulic cylinders or drives that direct the motion (direction and speed) of various components on the subject under control. Hydraulic system controller 36, as an example, may provide the standard hydraulic cylinder directed extension or retraction of the boom in a telescoping boom lift vehicle. Hydraulic system controller 38, as an example, may provide the left and right swing motion associated with the platform of a typical telescoping boom lift vehicle. Hydraulic system controller 40, as a further example, may provide a separate tilt mechanism associated with the elevated platform, one that is not typically combined into the two-axis joystick controller mentioned above, but may simply be a single axis bi-directional control mechanism.

Also associated with microprocessor/controller 34 is tilt sensor 42 which is generally located on boom lift truck 50. In preferred embodiments, tilt sensor 42 is a multi-axis sensor. Tilt sensor 42 is configured to send signals to microprocessor/controller 34 related to the boom angle of boom lift truck 50. As the boom angle approaches the maximum value according to its mechanical limits, tilt sensor 42 sends a signal to microprocessor/controller 34. After receiving such signal, microprocessor/controller 34 generates a command signal which is sent to haptic driver 46. Haptic driver 46 then generates a command signal to drive haptic actuator 48. Upon receipt of the command signal from haptic driver 46, haptic actuator 48 then causes joystick handle 12 to vibrate which, in turn, signals the operator of boom lift truck 50 that a dangerous situation is imminent. Haptic actuator 48 may be either an eccentric rotating mass (ERM) motor or a linear resonant actuator (LRS), as would be understood by those of ordinary skill in the art.

In a similar manner as with tilt sensor 42, proximity sensor 44 is likewise associated with microprocessor/controller 32. Proximity sensor 44 can be positioned on boom lift platform 60 such that any external obstacle with which boom lift platform 60 may be at risk of colliding may be sensed by proximity sensor 44. In a similar manner as described above with respect to tilt sensor 42, proximity sensor 44 outputs a signal to microprocessor/controller 32 indicating an external obstacle in the path of travel of boom lift platform 60. Microprocessor/controller 32 then sends a command signal to haptic driver 46 to activate haptic actuator 48 so that joystick handle 12 will vibrate to alert the operator of such a potentially dangerous condition. In preferred embodiments of the disclosed system, the haptic feedback generated by haptic actuator 48 will be a heavy or maximum vibration which represents an indication to the operator of a potentially dangerous condition during operation of the boom lift.

Overall Control System.

Figure 8:
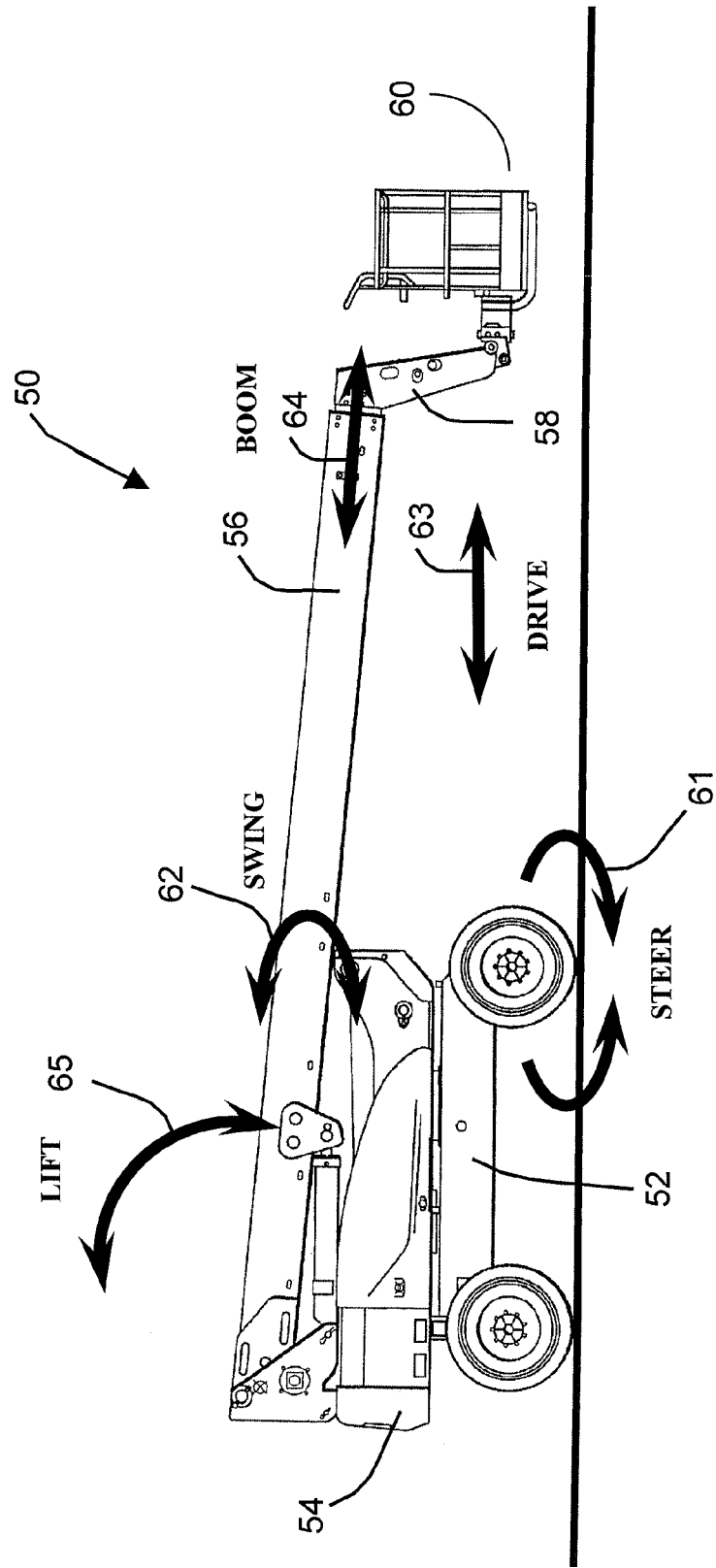
FIG. 8 shows a side view of a typical telescoping boom lift vehicle of the type that is utilized in many different construction projects as well as maintenance and utility work, with the joystick controller 10 of the present invention incorporated therein.

FIG. 8 provides an example of a typical vehicle that might utilize one or more of the joystick controller systems of the present invention. FIG. 8 provides a side view of a typical telescoping boom lift vehicle of the type that is utilized in many different construction projects as well as maintenance and utility work. A typical boom lift truck 50 is configured with a wheeled boom lift base 52. Positioned on wheeled boom lift base 52 is rotating base support 54. Positioned on and extending from rotating base support 54 is main boom 56. Configured within main boom 56 is telescoping boom 58. Positioned and attached to telescoping boom 58 is boom lift platform 60. The user/operator of boom lift truck 50 may control the motions of the subject from platform 60 or from the ground in association with boom lift base 52. In either case, there are four basic motions associated with boom lift truck 50 that may be controlled by way of the multi-directional joystick controllers of the present invention. A first such multi-directional joystick controller may provide the necessary integrated controls for lift motion (shown in association with platform 60 in FIG. 8) and swing motion (shown in association with main boom 56 in FIG. 8). As described above in the examples associated with the telescoping motion of a boom lift truck, a single joystick controller of the present invention may allow the operator (again, either on the ground or in boom lift platform 60) to simultaneously direct the lifting motion and the swing motion. In some embodiments, the lift motion may actually be a controlled combination of the extension/retraction of telescoping boom 58 and the raising/lowering of main boom 56.

A second joystick controller of the present invention may combine the motion elements associated with the actual translational movement of the boom lift truck 50 across a driving surface and would involve a drive motion and a steering motion that would include forward and reverse, as well as left and right steering (each as shown in connection with boom lift base 52 in FIG. 8). Various additional motions of the basic vehicle under control may be anticipated through additional uses of the joystick controller of the present invention.

Return of Joystick to Neutral Position.

Figure 9:
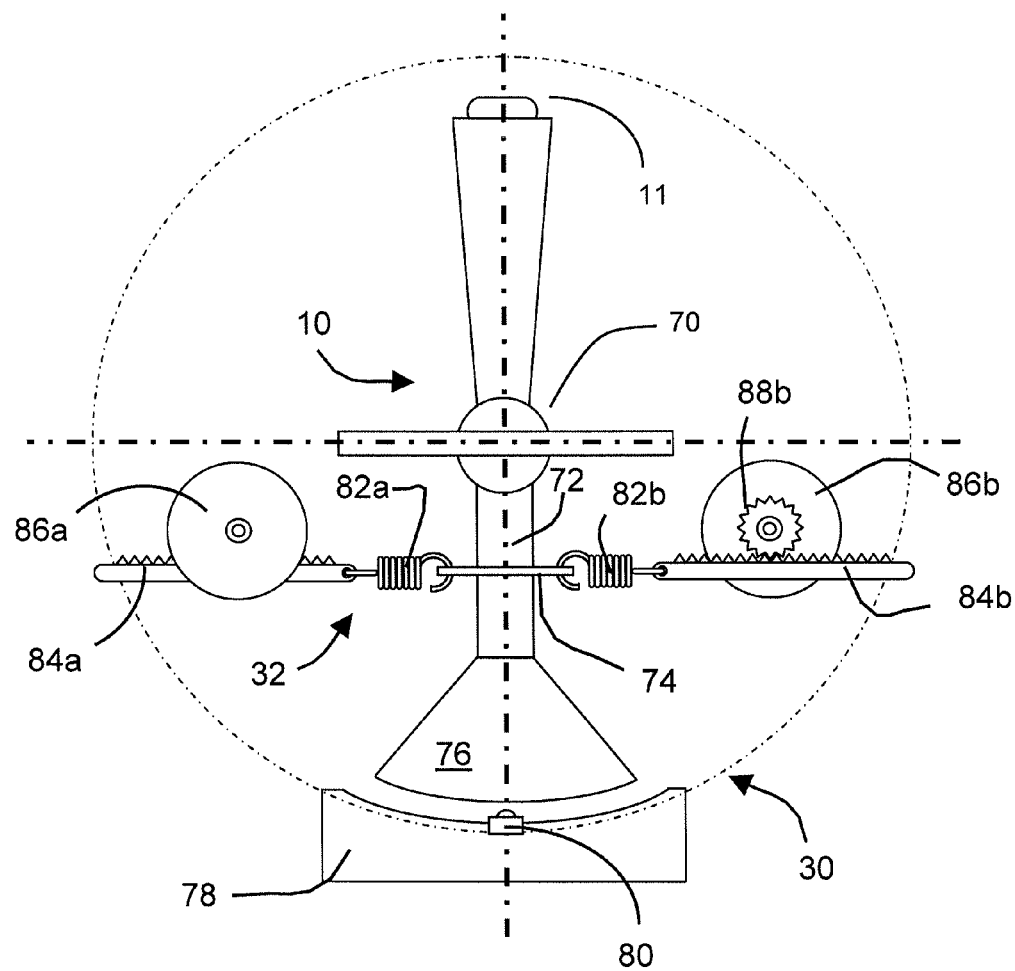
FIG. 9 illustrates a side elevation view of the joystick control controller components for controlling the position of the joystick in response to actual speed.
Figure 10:
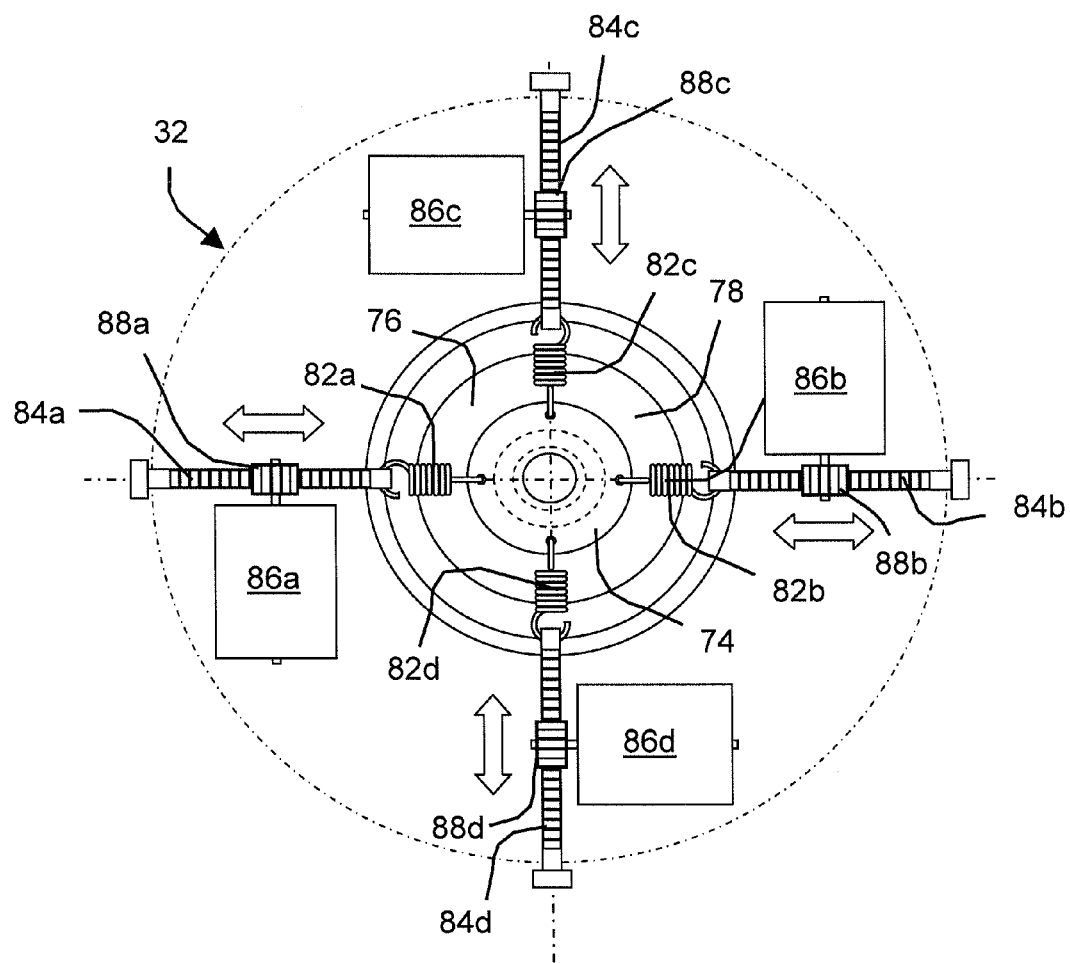
FIG. 10 discloses an overhead view of one of the alternative structures for a joystick controller 10 according to various teachings of this invention.

Reference is now made to FIGS. 9 & 10 for a detailed description of a first example of a manner of implementing the joystick neutral return controller 32 mentioned generically above. FIGS. 9 & 10 show the use of a combined spring bias and linear actuator or passive dampener system that both senses the position of the joystick controller and directs its position by means of position control signals from the microprocessor. The objective of the system shown is to allow manipulated movement of the joystick and at the same time direct its movement when the manipulation force is released or reduced. In other words, the system must accommodate free motion of the joystick by the operator/user and yet still direct the motion when no overriding force is experienced from the manipulation by the operator. The solution to this combined functionality involves both spring-biased mechanisms and free motion linear actuator mechanisms positioned in association with the dual-axis structure of the joystick motion control. A separate joystick position sensing device is also shown and described in FIGS. 9 & 10.

Override.

Referring to FIG. 9, joystick 10 is shown to have a joystick pivot center 70. Override switch 11 is shown as it would preferably be positioned at the apex of the joystick where the operator may easily access it without releasing the joystick. Joystick control shaft 72 extends below the working surface of the control panel associated with the device implementing the system. On joystick control shaft 72 is positioned control ring 74, seen best in FIG. 10. Attached to joystick control shaft 72 and positioned below it in the structure shown in FIGS. 9 & 10 is joystick base moving surface 76 which provides a primary functional component of the joystick position sensor system 30. Position sensor base 78 and motion sensor 80 provide the balance of the basic components associated with the joystick position sensor 30.

Joystick Speed Control.

The joystick position control or neutral return controller 32 includes, as mentioned above, motion dampeners (tension springs and/or flow-limited pistons) 82a-82d. Further included in the return controller system 32 are actuators and/or dampeners (gear rails, in the example given) 84a-84d. These linear actuators 84a-84d are driven by actuator drivers (rotary electric motors in the example given) 86a-86d. Actuator drivers 86a-86d are connected to the actuators 84a-84d by actuator connectors 88a-88d. In the preferred embodiment, actuator connectors 88a-88d are engagement gears positioned on the drive shafts of the motors and engaging the gear rails.

The system shown in FIG. 9, a side view, is limited to two of the four linear actuator systems of the invention for clarity. In this view, one of the two motors 86a and 86b is shown in a manner that shows engagement gear 88b which is hidden in the second system. FIG. 10 on the other hand, which is a top view through the control panel of the system implementing the joystick controller, discloses each of the four linear actuators generally positioned at opposite ends of the two motion axes of the joystick controller. In this manner, the joystick controller allows the operator to manipulate the joystick in the same 360° radial motion as described above and likewise allows the microprocessor/controller-based system to automatically and independently manipulate the position of the joystick according to the functionality described by the present invention.

In addition to directing the motion of the joystick (when for example the user releases the control), the system of linear actuators also serves to provide the tactile feedback of the functionality of the present invention, by resisting the sudden or overly rapid movement of the joystick by the user. In other words, the linear actuators preference the joystick to a position (not just the neutral position) in a manner that resists the user's effort to more rapidly reposition the joystick (and thereby more rapidly change the motion of the vehicle component). This resistive functionality will remain in place unless and until the override switch cancels such functionality. Depending on the type of joystick actuators and/or dampeners used, this override may simply allow the drive motors (as an example) to rotate freely.

Alternative Components.

It should be understood that, even though the present inventions have been described in the context of certain types of controls with certain types of components, many aspects of the inventions can be appreciated with a wide variety of other types of controls and other types of components so long as the structure, functionality or purpose that is expressly claimed is still achieved either literally or in an equivalent but different manner. For instance, there are countless types of joystick position controls, or even more other types of lever-based or knob-based variable speed controls. Moreover, as indicated previously, some of the basic functionality of the present invention can be implemented with the quad-directional type joystick controller of the type discussed above (FIGS. 9 & 10) or with a bi-directional toggle lever controller of the type associated with other independent motions on many types of hydraulic equipment.

As well, many of the components of the illustrated embodiments can be substituted with equivalents, even if they are expressly required by claims defining the inventions of this or related applications. Motion dampeners, for instance, can be achieved electronically rather than mechanically, and pneumatic or other fluid-based dampeners may be substituted for spring-like dampeners. Certainly, it will be well appreciated that there are a vast number of different types of linear actuators and drivers other than mechanical gear rails and motors—solenoids, fluid-driven pistons, rocker-and-pawl assemblies, and screw-actuators just to name a few—while even radial or other non-linear actuators might achieve equivalent functions and purposes depending on the scope of the claims.

Various alternate types of linear actuators for controlling the position and resistive force of the joystick are anticipated. These could include in-line (co-axial) linear shaft actuators coupled to motors; micro-hydraulic two-way linear motion cylinders and pumps; and micro-pneumatic two-way linear motion cylinders and pumps. Various alternate devices for tracking the position of the joystick are also anticipated. In addition to the position sensor device described above, optically tracked micro-gears connected to the joystick may likewise provide the microprocessor/controller of the present invention with the accurate position information needed to effect the functionality of the system. Those skilled in the art will recognize other devices known to provide accurate controlled motion or to provide accurate position information, along the lines described above.

Control Panel.

Figure 11:
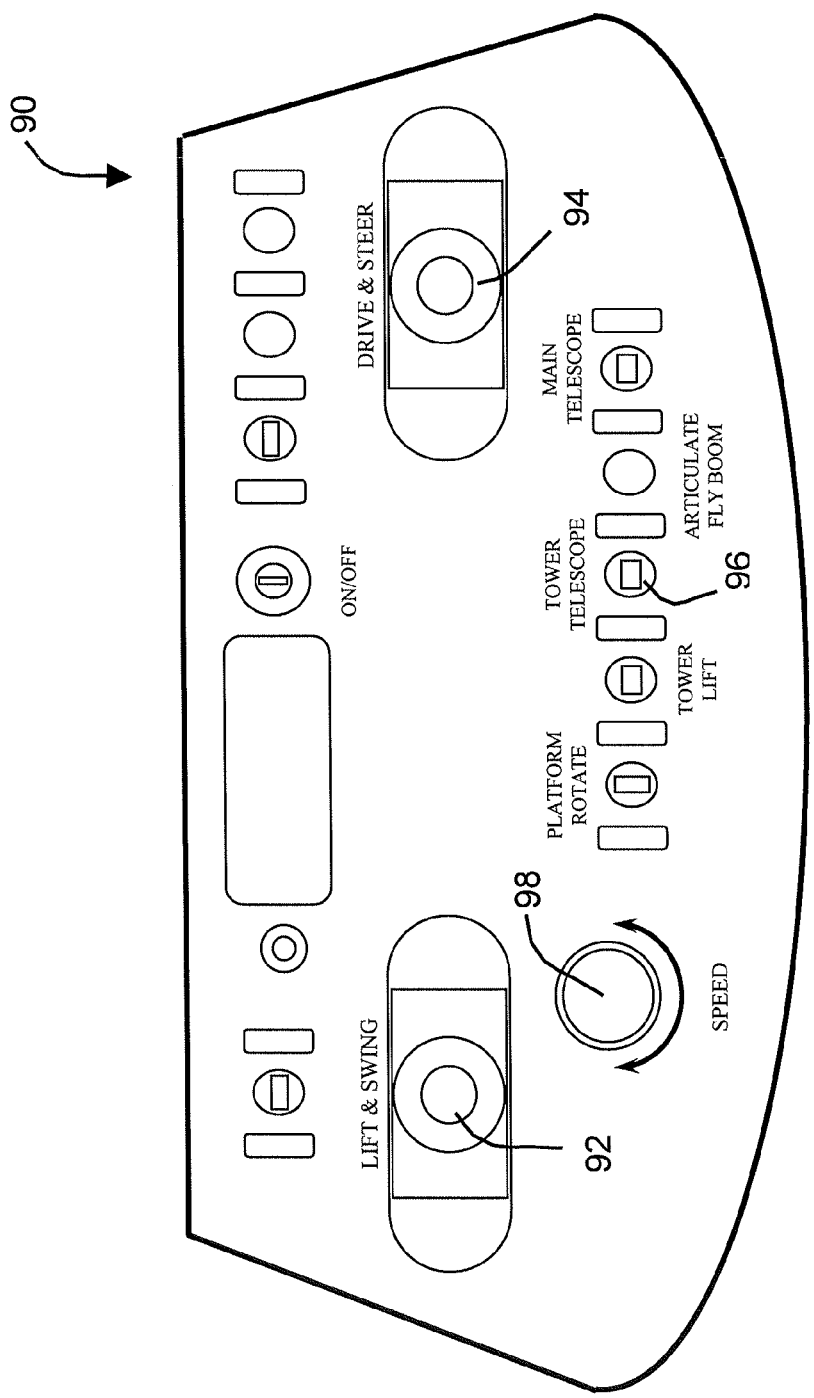
FIG. 11 illustrates two different joysticks according to the teachings of FIGS. 4-10 incorporated into a typical instrument control panel for a boom lift vehicle of the type shown in FIG. 8.

FIG. 11 provides an example of a typical instrument control panel for a boom lift vehicle of the type shown in FIG. 8. On this control panel 90, two separate quad-directional joystick controllers 92 & 94 are shown, the first joystick 92 handling the "Lift & Swing" motions and the second joystick 94 handling the "Drive & Steer" motions of the vehicle.

Elsewhere on the control panel 90 are a number of independent hydraulic control switches structured as simple bi-directional lever controllers. Typical of these types of control levers is "Tower Telescope" control lever 96. The basic functionality of the present invention could easily be applied to such bi-directional lever controls. Both the free-release neutral return mode and the forced neutral return mode may be implemented with these more simple configurations. In either mode, the rate at which motion speed of a moving component changes can be (and typically is) modified by a centralized speed control knob 98. In the present invention, the speed control 98 would still regulate the rate at which the motion of the vehicle component increases (or decreases) as the joystick is moved. That is, a very rapid movement of the joystick to a full forward position could direct a very rapid movement of the hydraulic component (a steep initial slope to the solid line in FIGS. 3 & 4) or, if the speed control is set lower, a more gradual increase in the motion of the component (a less steep initial slope in FIGS. 3 & 4).

Overall System and Method Alternatives.

It should also be understood that, rather than limiting the invention to boom lift platforms, alternative embodiments of broader aspects of the invention are adapted for use with any other object the position or speed of which are controlled with a remote control or some form of lever-based or knob-based electronic control. As examples that will be understood by those of skill in the art, even though the preferred embodiments relate to control systems and methods for boom lift platforms, various aspects of the present invention will also find utility in alternative embodiments in backhoes, skid-steer loaders, fork lifts and other off-highway construction vehicles. Indeed, some aspects may be used in virtually any system for controlling the position and/or speed of any subject, whether the subject is an aerial platform as in illustrated embodiments, or whether the controlled subject is some other object or even a flow of fluids that can be controlled using a lever-based or knob-based speed/position control with some form of proportional control.

Those of skill in the art will also understand that proportional controls may include controls where speed is continuously proportional to the relative position of the lever or knob, as well as controls where only two or three speeds are available and yet the speeds are related to discrete steps in movement of the lever away from a neutral position. For ease of reference for these purposes, while it should be recognized that knobs can be the equivalent of levers because force from the edge of the knob creates a moment about the center of the knob like a lever about its fulcrum, use of the terms "lever," "lever-based" features or the like should be interpreted to encompass knobs and knob-based features unless expressly stated or clearly intended otherwise.

Those of skill in the art will also understand that aspects of the invention may involve or be used with actuators of other types other than hydraulic actuators. So, even though some aspects of the invention provide exceptional benefits with hydraulic actuators, actuators may also be electric, pneumatic, electro-magnetic, or some combination of the various different types of known actuators. Use of the term "actuator" or the like should therefore be interpreted to encompass any type of actuator unless expressly stated or clearly intended otherwise.

Still other embodiments of the invention relate to application-specific machines that incorporate controls according to the teachings reflected herein, as well as subsystems, macrosystems or methods for performing all or part of the processes described or inferred herein. While there are many variations within the scope of the invention, one of ordinary skill in the art should consider the scope of the invention from a review of the claims appended hereto (including any amendments made to those claims in the course of prosecuting this and related applications) as considered in the context of the prior art and the various descriptions of this application.

Numerous variations, substitutions, modifications and simplifications will still fall within the scope of the inventions that are the subject of this application. Many other features, benefits and advantages of the inventions related to the embodiments referenced herein will be evident to those of skill in the art in light of an exhaustive review of the prior art.

Even though the foregoing embodiments represent the most preferred at present, those of ordinary skill in the art will recognize many possible alternatives that we have not expressly suggested here. While the foregoing written descriptions enable one of ordinary skill to make and use what is considered presently to be best modes of the invention, those of ordinary skill will understand and appreciate the existence of variations, combinations, and equivalents of the specific embodiment, method, and examples herein. It should be understood that the drawings and detailed descriptions herein are to be regarded in an illustrative rather than a restrictive manner, and are not intended to limit the invention to the particular forms and examples disclosed. To the contrary, the invention includes any further modifications, changes, rearrangements, substitutions, alternatives, design choices, and embodiments apparent to those of ordinary skill in the art, without departing from the spirit and scope of this invention, as defined by any claims included herewith or later added or amended in an application claiming priority to this present filing. The invention covers all embodiments within the scope and spirit of such claims, irrespective of whether such embodiments have been remotely referenced here or whether all features of such embodiments are known at the time of this filing. Thus, it is intended that the claims be interpreted to embrace all further modifications, changes, rearrangements, substitutions, alternatives, design choices, and embodiments that may be evident to those of skill in the art. In any case, all substantially equivalent systems, articles and methods should be considered within the scope of the present invention.

I claim:

1. A motion control system for controlling the movement of a hydraulically powered implement relative to a physical reference, said motion control system comprising:
   a) a joystick controller having a joystick handle for manually controlling movement of the powered implement relative to said physical reference;
   b) said joystick handle being connected to said joystick controller;
   c) a motion monitoring system associated with sensors to monitor the position of said powered implement relative to said physical reference;
   d) said motion monitoring system being configured to generate a signal indicative of actual motion of said powered implement relative to said physical reference;
   e) a handle position controller being configured to receive said signal indicative of the actual motion of said powered implement relative to said physical reference, and said handle position controller further being configured to influence the position of said joystick handle in relation to said signal; and
   f) said handle position controller further being configured to influence said joystick handle to be closer to a first extent in a first direction than a neutral position if the actual motion of said powered implement relative to said physical reference is closer to a first movement than a null movement.

2. The motion control system of claim 1, further comprising:
   a) controls and circuitry adapted to effect said null movement when said joystick handle is in said neutral position, said first movement when said joystick handle is in a first non-neutral position that is spaced in said first direction from said neutral position, and a second movement when said joystick handle is in a second non-neutral position that is spaced in the same first direction from said neutral position, the second non-neutral position being spaced further from said neutral position than the first non-neutral position, and the second movement being greater than the first movement;
b) a position bias associated with said joystick handle to bias the position of said joystick handle toward the neutral position when said joystick handle is released from the second non-neutral position; and
c) a handle position influence that influences the position of said joystick handle in relation to said signal, said handle position influence being adapted to influence said joystick handle to be closer to the first non-neutral position than the neutral position if said signal indicates that the actual motion of said powered implement relative to said physical reference corresponds to the first movement, thereby influencing the position of said joystick handle to provide tactile feedback to an operator who is operating said joystick handle, the tactile feedback being indicative of the actual motion of said powered implement relative to said physical reference.

3. The motion control system of claim 2, wherein:
a) said joystick handle is positioned in a full forward position when said joystick handle is moved to the second non-neutral position;
b) said joystick handle is manually releasable from said full forward position; and
c) said positional bias and said handle position influence are associated with said joystick handle in a manner such that said joystick handle gradually returns to its neutral position at a rate related to the rate at which the actual motion of said powered implement is reduced toward said null movement.

4. The motion control system of claim 2, wherein:
a) said controls and circuitry are adapted to effect a non-zero movement when said joystick handle is positioned in any non-neutral position;
b) when said joystick handle is positioned in said any non-neutral position, said joystick handle may be moved toward the neutral position either by manually releasing said joystick handle from said any non-neutral position or by manually forcing said joystick handle from said any non-neutral position toward the neutral position;
c) said positional bias and handle position influence are associated with said joystick handle in a manner such that, if said joystick handle is manually released from said any non-neutral position, then said joystick handle gradually returns toward its neutral position at a rate commensurate with the rate at which the actual motion of said powered implement itself is reduced toward said null movement;
d) said controls and circuitry are associated with said joystick handle to control the movement of said powered implement; and
e) said positional bias and handle position influence are associated with said joystick handle in a manner such that, if said joystick handle is manually forced toward the neutral position from said any non-neutral position, then said joystick handle may be manually forced completely to the neutral position while the powered implement has a non-zero movement, and said controls and circuitry cause the movement of said powered implement to be more rapidly reduced toward said null movement than if said joystick handle was manually released from said any non-neutral position.

5. The motion control system of claim 2, wherein:
a) said joystick handle of said joystick controller is centrally positioned on a joystick controller area of an instrument control panel;
b) said joystick controller further comprises a cover surrounding said, joystick handle;
c) said joystick handle of said joystick controller is movable in multiple directions, said multiple directions including four orthogonal directions respectively corresponding to forward, backward, leftward and rightward directions relative to said joystick controller on said instrument panel;
d) said controls are adapted and connected to coordinate a plurality of actuators to move said powered implement in a horizontal plane; and
e) said joystick controller being associated with said controls such that:
(i) movement of said joystick handle in the forward orthogonal direction causes said plurality of actuators to move said powered implement in a forward direction in the horizontal plane; and
(ii) movement said joystick handle in the backward orthogonal direction causes said plurality of actuators to move said powered implement in a direction that is opposite the forward direction in the horizontal plane.

6. The motion control system of claim 5, further comprising:
a) said joystick controller comprising a multi-directional joystick controller that provides necessary integrated controls for lift motion and swing motion; and
b) said joystick controller allowing an operator to simultaneously direct a lifting motion and a swing motion.

7. The motion control system of claim 5, further comprising:
a) a microprocessor/controller directing control of multiple hydraulic system controllers, each of which is associated with one or more hydraulic cylinders or drives that direct the motion, including direction and speed, of various components on a subject under control of a boom lift;
b) one or more of the hydraulic system controllers providing said one or more hydraulic cylinders directed extension or retraction of a boom in a telescoping boom lift vehicle;
c) providing a left and right swing motion associated with the platform of a telescoping boom lift vehicle; and
d) providing a separate tilt mechanism associated with said platform.

8. The motion control system of claim 1, wherein optically tracked micro-gears are connected to said joystick handle and likewise provide a microprocessor/controller with accurate position information to affect control of the system.

9. The motion control system of claim 1, further comprising:
a) a joystick position sensor identifying all manipulated positioning of said joystick handle through two translational axis coordinates; and
b) a joystick neutral return controller operating to direct the position of said joystick handle through said axis coordinates;
c) said joystick position sensor being electronically connected to said joystick handle and a microprocessor/controller;

d) said joystick neutral return controller being electronically connected to said joystick handle and said microprocessor/controller;

e) said joystick position sensor being adapted to provide joystick position information to said microprocessor/controller, thereby serving as a basis for directing the motion of a plurality of hydraulic system controllers;

f) said joystick neutral return controller being adapted to receive control signals from said microprocessor/controller and directing actual automated positioning of said joystick as a result; and g) an override switch electronically connected to said microprocessor/controller such that activation of said switch terminates a resistive feedback force that said joystick neutral return controller typically provides.

10. The motion control system of claim 9, further comprising:

a) a haptic driver electronically connected to said microprocessor/controller;

b) a haptic actuator electronically connected to said haptic driver;

c) said haptic actuator being driven by said haptic driver, in response to a signal from said microprocessor/controller, to cause said joystick handle to vibrate in response to a physical condition of said powered implement.

11. The motion control system of claim 10, further comprising:

a) a proximity sensor adapted for detecting the position of said powered implement in relation to external obstacles; and b) a tilt sensor adapted for detecting an angle of extension of said powered implement.

12. The motion control system of claim 11, wherein said neutral return controller provides tactile feedback to said joystick handle, where said joystick handle gradually returns to its neutral position by resisting sudden or overly rapid movement of said joystick handle by a user wherein:

a) said neutral return controller mechanically prefers that said joystick handle change positions in a manner that resists the user's effort to more rapidly reposition said joystick, and thereby more rapidly change the motion of said powered implement; and b) said resistance occurs unless and until said override switch cancels such resistance.

13. The motion control system of claim 10, wherein said joystick neutral return controller further comprises:

a) motion dampeners including tension springs and/or flow-limited pistons connected to a plurality of actuators and/or dampeners;

b) said actuators and/or dampeners are connected to actuator drivers by actuator connectors;

c) said actuators are driven by said actuator drivers; and d) said actuator connectors are engagement gears positioned on a drive shaft of a motor and engaging said dampeners.

14. The motion control system of claim 9, wherein:

a) said joystick neutral return controller uses a combined spring bias and linear actuator or passive dampener system that both senses the position of said joystick handle and directs said joystick handle's position by means of position control signals from said microprocessor/controller;

b) said spring bias and linear actuator are positioned and associated with dual axis structures of a joystick motion control; and c) said joystick handle's position is detected by a separate joystick handle position-sensing device.

15. The motion control system of claim 1, wherein said powered implement comprises a forklift, and wherein said physical reference comprises a cab of said forklift.

16. The motion control system of claim 1, wherein said powered implement is a boom lift platform, and wherein said physical reference comprises a boom lift base.

17. The motion control system of claim 1, further comprising said joystick controller combining motion elements associated with actual translational movement of said physical reference across a driving surface, and involving a drive motion and a steering motion that would include forward and reverse, as well as left and right steering.

* * * * *